Oct. 13, 1931.  G. A. PARDEE  1,827,100

AIR VALVE FOR NURSING BOTTLES AND NIPPLES

Filed Sept. 26, 1927

Inventor:
George A. Pardee

Patented Oct. 13, 1931

1,827,100

UNITED STATES PATENT OFFICE

GEORGE A. PARDEE, OF OMAHA, NEBRASKA

AIR VALVE FOR NURSING BOTTLES AND NIPPLES

Application filed September 26, 1927. Serial No. 222,062.

The invention relates to improvements in nursing bottles and nipples by the eliminating of a vacuum or possibility thereof, in the bottle or nipple, thereby (a) insuring a uniform and continuous flow of food through the extracting hole of the nipple, (b) preventing the nipple losing its shape through vacuum, (c) preventing the food being held back by vacuum, (d) preventing the vacuum causing air to be sucked through the hole instead of the food.

Figure 1:
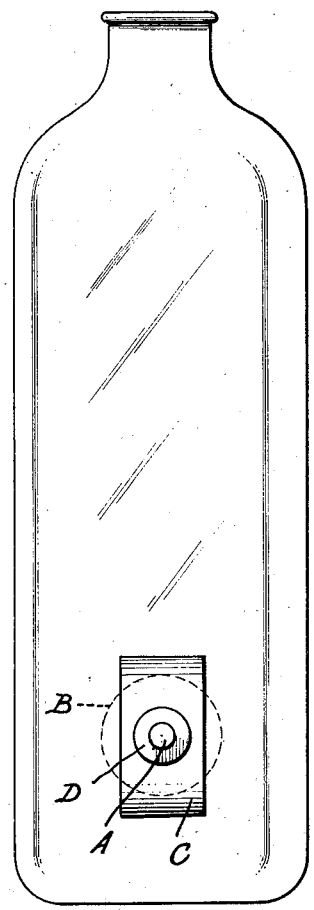
Figure 2:
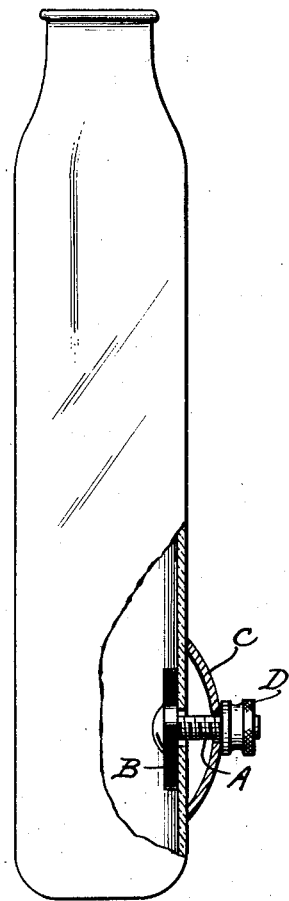
Figure 3:
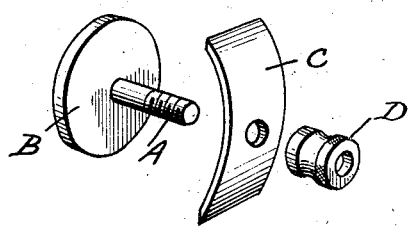

The invention is illustrated in the accompanying drawings, in which Fig. 1 is a side elevation of a nursing bottle showing the air valve applied thereto; Fig. 2 is a view showing in cross section the air valve of Fig. 1; and Fig. 3 is a view showing the parts of the valve in disassembled position.

The valve can be inserted at any point within the bottle through a hole made in the bottle, or in the nipple at a point anywhere on the nipple, preferably in an opening therein.

The valve consists of four parts, viz: (A) a small bolt, (B) a rubber gasket, (C) a spring, (D) a thumb screw, threaded. The gasket B has a hole in it slightly smaller than the bolt so as to insure a snug fit around the body of the bolt, thereby preventing air from leaking through any irregularities on the surface of the bolt A; the spring C has a hole in the center thereof slightly larger than the body of the bolt; and the thumb screw D has an opening in the center threaded so as to fit the threads upon the bolt A. The bolt A is fitted through the gasket B, and this part of the assembly is placed on the inner side of the wall of the nursing bottle or nipple. The spring C is then placed over the bolt as shown in illustration Figure 1, the thumb screw D being placed immediately next to the spring C. The hole in the wall of the bottle is somewhat larger than the body of the bolt A, to permit entrance of air.

In operating, the loosening of the thumb screw permits air to enter the nursing bottle between its inner wall (or the inner wall of the nipple) and the gasket B. The pressure of the milk or food inside of the bottle against the gasket prevents leakage through the valve hole in the bottle. The spring C reduces possibility of the bottle breaking through too much tightening of the thumb screw D, and further eliminates possibility of the thumb screw D lodging against the outer wall of the nursing bottle or nipple so as to shut off the inflow of air. Further, the spring C acts as a stabilizer for the parts assembled.

The air valve is adjustable by means of the thumb screw D so that the milk or food will not pass through the hole of the nipple until and unless the babe or young animal sucks at the nipple, the sucking operation causing the valve to open by the gasket or washer being drawn inward from the inner wall of the bottle or nipple, thereby permitting the entrance of air through such opening. Immediately the sucking stop, the spring C returns the gasket B firmly against the inner wall of the bottle.

I claim:

The combination with a nursing receptacle having therein an opening other than that through which the liquid food is withdrawn, of a valve for controlling admission of air to the receptacle through said opening, said valve comprising a head portion arranged to cover said opening within the receptacle, a stem connected with said head and extending through said opening, a spring connected with said stem outside the receptacle and adapted to pull outwardly upon said stem, and adjusting means for varying the tension of said spring.

GEORGE A. PARDEE.